United States Patent Office 3,009,481
Patented Nov. 21, 1961

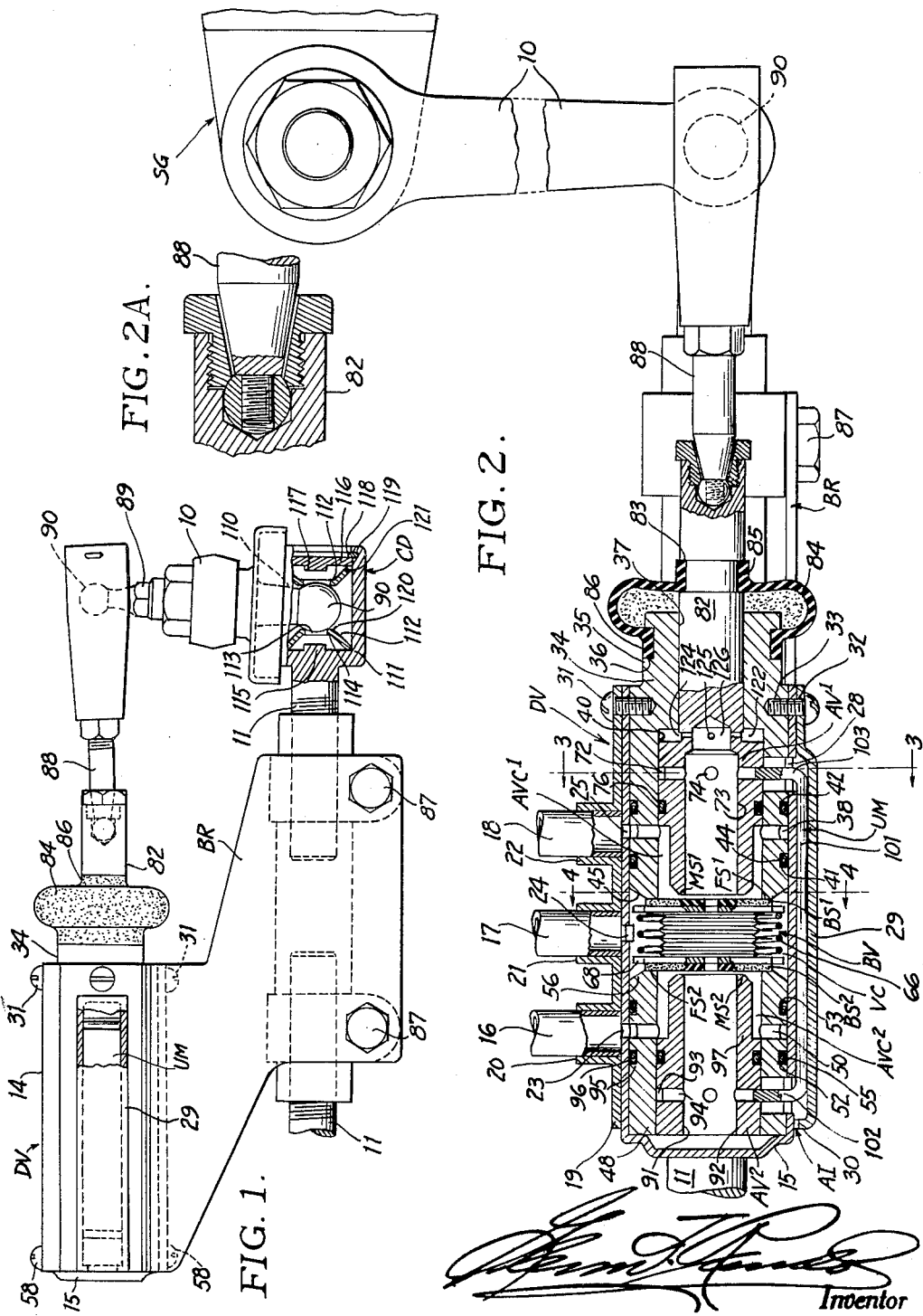

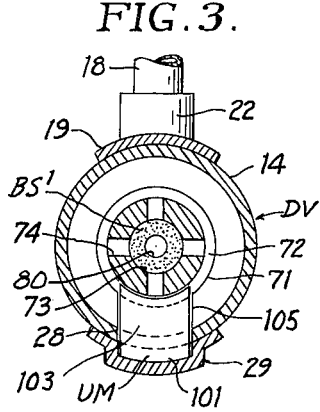
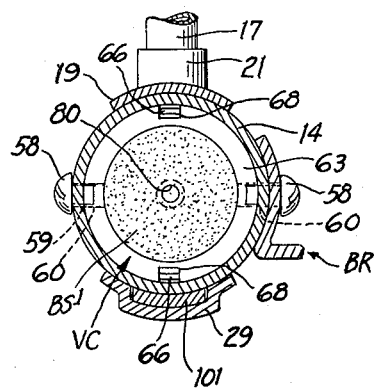
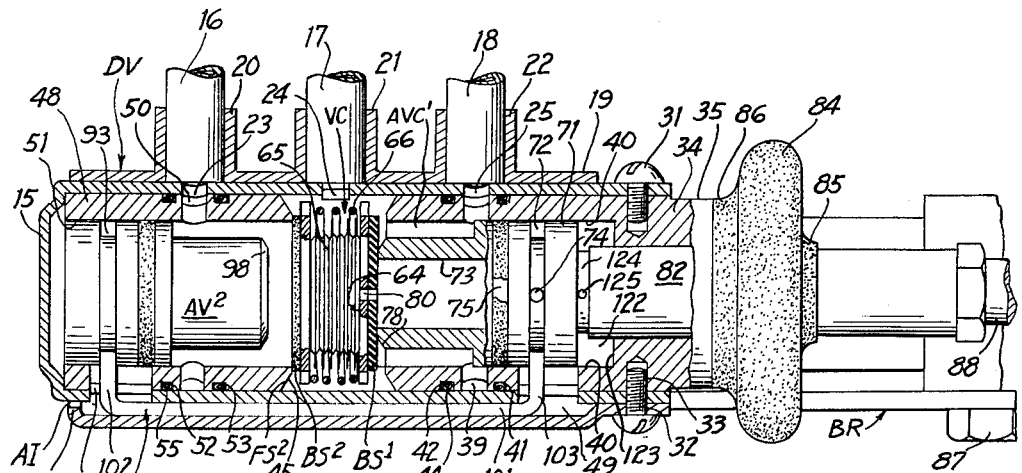
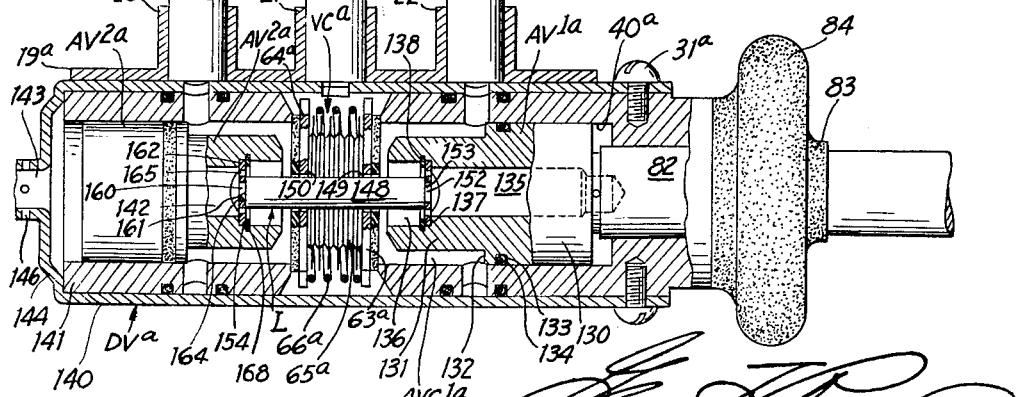

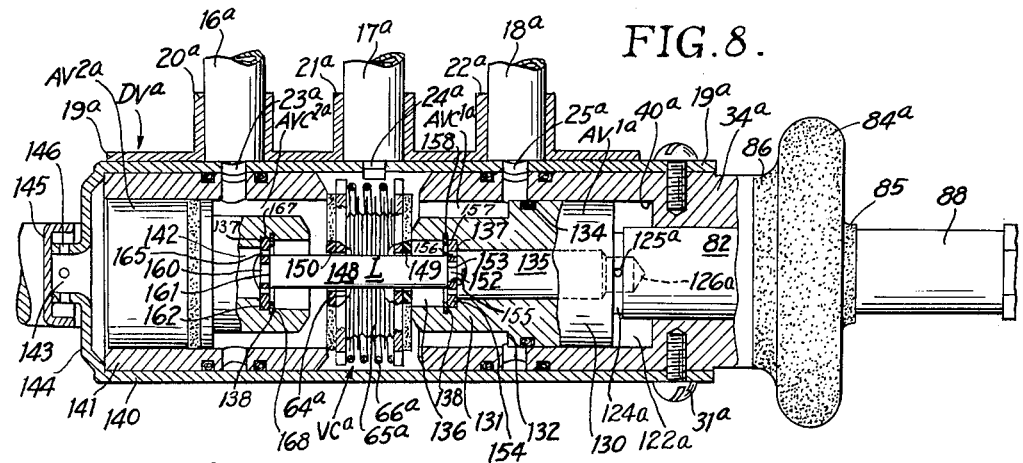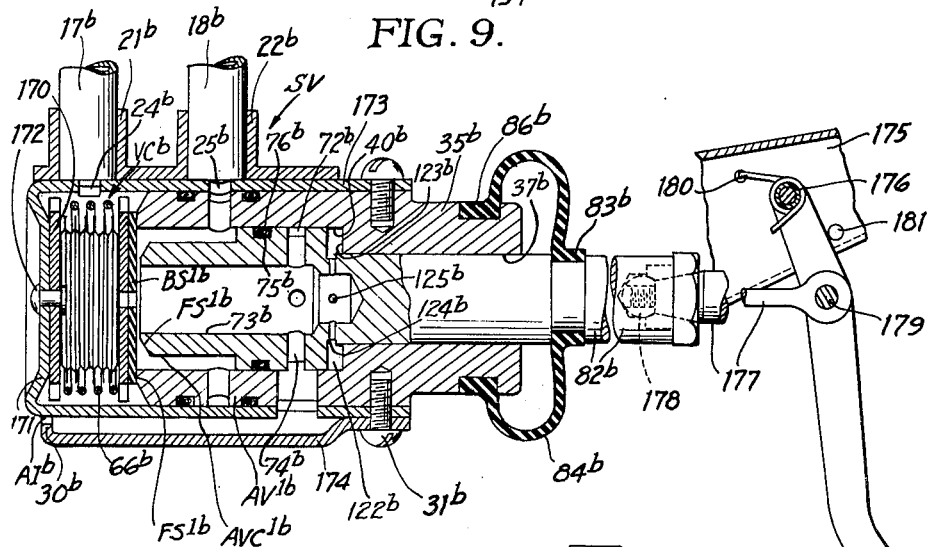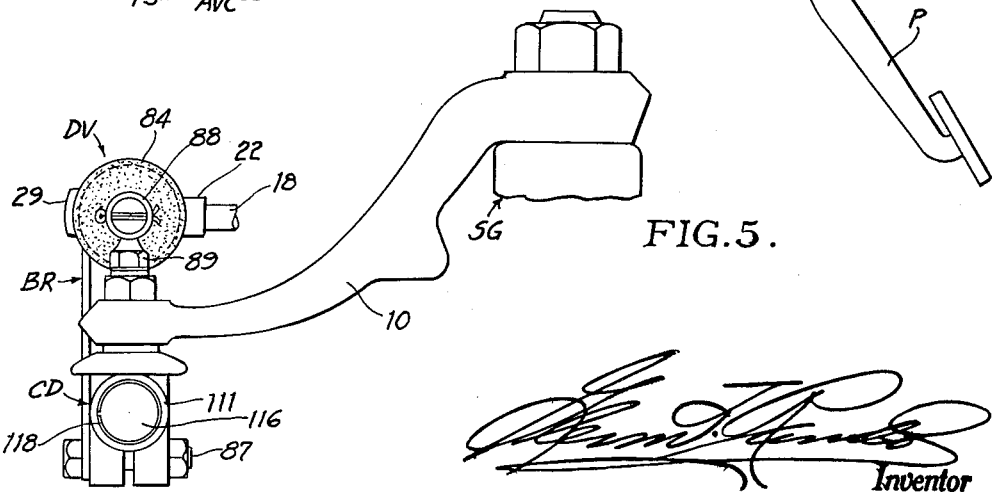

3,009,481
CONTROL VALVE ADAPTED FOR VACUUM-POWER STEERING USE
Glenn T. Randol, 2nd Ave. and Paull St., Box 275, Mountain Lake Park, Md.
Filed Oct. 5, 1959, Ser. No. 844,527
12 Claims. (Cl. 137—622)

This invention relates to poppet-type valve mechanisms, and more particularly to an improvement in such a valve mechanism for use with vacuum-power steering systems for motor vehicles and the like, said improved valve mechanism being adapted to apply vacuum-power steering effort to assist manual steering effort to actuate mechanical steering apparatus.

In the prior art power steering mechanisms and especially those used commercially, the control valve is either incorporated in the steering column or in the cross rod (drag link) which requires altering the structural of conventional manual steering systems to accommodate such steering mechanisms and thus adds to the cost. Irrespective of the type of power utilized for steering assistance, the control valve therefor must be located in a manner for operation in response to manual steering effort applied to the steering gear through the steering wheel of the vehicle.

The present invention seeks to provide novel control valve means, particularly adapted to control a double-acting vacuum-energized servomotor of the type disclosed in applicant's earlier filed application, Serial No. 801,239, filed March 23, 1959, but not limited to such type, that is readily attachable to the existing original equipment steering linkage for actuation by the steering pitman arm connected through the steering gear to the manual steering wheel.

With the foregoing in view, the primary object of the invention is to provide improved control valve means for controlling differential pressures to actuate such a servomotor to enable the latter to apply vacuum-power steering assistance to the conventional steering gear of automotive vehicles in response to manual turning of the steering wheel thereof which applies the vacuum steering assist in a smooth and gradual manner without any tendency to "over-steer" the dirigible wheels of the vehicle in relation to a given steering wheel position.

Another object is to provide an improved economical double-acting poppet-type control valve particularly advantageous in pressure differential power steering mechanisms which is self-sealing and produces a very smooth mergence of manual steering effort with vacuum steering effort.

A further object related to the object immediately preceding is to construct such control valve with a housing fixed on said cross rod and having suitable tubular connections to a vacuum source and to opposite ends of said servomotor, one of said connections communicating with an interior vacuum chamber defined by a pair of longitudinally spaced valve seats movable relatively with respect to one another and to a pair of cooperating fixed seats to control selective distribution of vacuum to one or the other of said connections to said servomotor to energize it in a corresponding direction of movement, said movable valve seats being interconnected by a collapsible assembly such as a metallic bellows, to isolate a pair of longitudinally spaced atmospheric chambers from said vacuum chamber, and a normally preloaded spring is operably disposed in said vacuum chamber to bias said movable seats apart into engagement with their respective fixed seats to seal off said atmospheric chambers from said vacuum chamber, the former chambers being normally connected to said servomotor to de-energize the same. A pair of movable air control valves is coaxially disposed, one in each of said atmospheric chambers, with respect to said movable valve seats and normally spaced therefrom to connect the ends of said servomotor to atmosphere, said air control valves being mechanically interconnected to move as a unit with one of said air valves being mechanically linked to the pitman arm of said steering gear whereby limited relative movement of the pitman arm with respect to the cross rod imparts a like movement to the air control valves to selectively connect the vacuum source to the ends of said servomotor to actuate the same in the corresponding selected direction to assist in steering the vehicle in that direction.

A further object related to the two objects next above is to construct the valve housing from sheet metal rather than a casting for more economical production thereof, and to provide novel means for combining said movable valve seats with said housing to produce a unitary assembly readily assembled and disassembled, said housing having a projection formed as a mounting bracket for attaching the control valve to the cross rod for movement as a unit therewith.

Another object is to provide in such a control valve, a single spring which serves to centralize (neutralize) the valve moving parts in relative positions corresponding to any halted position of the steering wheel through its full range of steering movement, said spring additionally serving to bias said movable valve seats into engagement with their respective fixed seats to establish such neutral condition wherein said servomotor is inactivated at any such halted position of said steering wheel, movement of said steering wheel being required to reactivate said servomotor to assist in steering the vehicle in the selected direction. The present invention contemplates use of the above single spring of sufficient strength to effect centralization of both the steered elements and movable parts of the control valve assisted by the reactionary forces from the ground wheels of the vehicles; however, auxiliary spring-loaded centralizing mechanism incorporated directly in the connection between the pitman arm and cross rod may be utilized in cooperation with such a single spring of less magnitude than would be required to serve as the sole means in the manner above stated.

Other objects and advantages of the invention will become apparent by reference to the following detailed description taken in connection with the accompanying drawing, in which:

FIGURE 1 is a side elevation of a portion of the steering linkage of a motor vehicle incorporating control valve means constructed in accordance with the present invention;

FIGURE 2 is a plan view of the depiction in FIGURE 1 with the control valve means per se shown on an enlarged scale in longitudinal section;

FIGURE 2A is a fragmentary view on an enlarged scale of FIGURE 2 showing structural details of the ball-joint interconnecting link between the actuatable member of the control valve and the steering pitman arm;

FIGURE 3 is a transverse sectional view taken along the line 3—3 of FIGURE 2 and showing on an enlarged scale, details of one of the air control valves and closely related structure;

FIGURE 4 is another transverse sectional view taken along the line 4—4 of FIGURE 2 and showing on an enlarged scale, details of one of the movable valve seats connected to the metallic bellows and closely related structure;

FIGURE 5 is an end elevation of my improved control valve showing the manner in which it is mounted on the cross rod and connected to the steering pitman arm;

FIGURE 6 is a view similar to FIGURE 2 but showing the parts operated to positions corresponding to activation of the servomotor to assist in making a right turn of the vehicle;

FIGURE 7 illustrates a modified form of my improved poppet-type valve means adapted to control a double-acting servomotor, said valve means being shown in normal "neutral" condition corresponding to FIGURE 2;

FIGURE 8 depicts an operated condition of the modified valve means shown in FIGURE 7, corresponding to FIGURE 6; and FIGURE 9 is another modified form of my improved poppet-type valve means adapted to control a single-acting pressure differential motor.

Referring now to the drawing and particularly to FIGURES 2 and 2A, wherein like reference characters identify like and corresponding parts throughout the several views, the preferred illustrative embodiment of the invention is disclosed in connection with a steering gear indicated by a fragmentary portion of its housing at "SG." The steering gear SG may comprise the usual steering column, steering shaft and steering wheel, a worm and sector connection between the steering shaft and swingable pitman arm 10. An idler arm (not shown) is pivotally mounted on the vehicle frame laterally spaced from the pitman arm 10 for identical arcuate movement with that of the pitman arm 10 through the cross rod or drag link connection 11.

My vacuum steering control valve generally designated by the letter character "DV," is mounted on the cross rod 11 preferably at the end connected to the pitman arm 10, however, this control valve DV may be incorporated elsewhere in the steering linkage or in the steering column where manual steering effort applied to the steering wheel to steer the dirigible wheels, road resistance to steering, and self-righting effort from the vehicle wheels responsive to the steering geometry are available to actuate or control the functioning of the control valve as is understood. In the preferred embodiment of my invention, the control valve means DV comprise: a cup-shaped cylindrical housing wall or body 14 closed at one end by a wall 15 and open at the other end, the exterior of the cylindrical wall of the housing being fitted with three longitudinally spaced rigid tubes 16, 17 and 18, preferably attached to the cylindrical wall by means of a complemental plate 19 preferably welded in air-tight sealed relation, and having corresponding outstanding tubular extensions 20, 21 and 22 respectively which receive said tubes to provide communication between the interior and exterior of said housing via ports 23, 24 and 25 through the cylindrical wall thereof. The housing is also provided with a pair of longitudinally spaced openings 27, 28 adjacent the ends thereof and diametrically disposed with respect to said tubes. An elongated hollow cover 29 of substantially rectangular cross section is provided to span the space between and including said openings. This cover has an end wall 30 with its inner end spaced from the exterior of the cylindrical wall of said valve housing to provide an air-inlet designated "AI" therebetween, and is secured at its opposite end to the exterior of the cylindrical wall by one of the cap screws 31 or otherwise, projecting through openings 32 adjacent the open end of said housing, into threaded holes 33 provided in a closure member 34. This latter member having a rearwardly extending reduced diameter portion 35, an annular external groove 36 adjacent the outer end thereof, and a central bore 37 coextensive with said portion 35 and closure member 34.

The portion of the closure member 34 which projects into said housing comprises: an external annular passageway 38 communicating with the port 25, a plurality of ports 39 through the wall of said passageway interconnecting the latter with a counterbore 40 merging with said central bore 37, said passageway being disposed between a pair of annular external grooves 41, 42 each equipped with a ring-like packing 44 to effect an air-tight seal between said passageway and port 25. The inner terminating end of said closure member is formed with an angular circular face portion 45 which merges with a vertical circular face $FS^1$ normal to the axis of said housing and which may be termed a "fixed valve seat."

Inwardly projecting from the end wall 15 is a complemental sleeve member 48 having an external annular passageway 49 communicating with port 23, a plurality of ports 50 through the wall of said passageway 49 interconnecting the latter with an axial bore 51 coextensive with said member 48, said passageway being disposed between a pair of annular external grooves 52, 53 each equipped with a ring-like packing 55 to effect an air-tight seal between this passageway and connected port 23. The inner terminating end of the sleeve member 48 is formed with an angular circular face portion 56 which merges with a vertical circular face $FS^2$ normal to the axis of said housing and which may be termed a "fixed valve seat." The sleeve member 48 is preferably fixed in its operating relation to said housing by two diametrically positioned cap screws 58 projecting through holes 59 in the housing into threaded registering holes 60 in the member 48 adjacent end wall 15 of the valve housing. It is, therefore, seen from an inspection of the drawing that the fixed valve seats $FS^1$, $FS^2$ are coaxial and longitudinally spaced from one another to form a vacuum chamber designated "VC" therebetween to be later referred to. In constant communication with said vacuum chamber is the said port 24 leading to the rigid tube 17.

Disposed between said valve seats $FS^1$, $FS^2$ in said vacuum chamber is a floating valve assembly generally designated "BV." This valve assembly comprises: a pair of longitudinally spaced circular seats $BS^1$, $BS^2$, preferably fabricated of molded rubber, which are bonded to the outer faces of a pair of complemental circular heads or discs 63, 64 respectively, said discs being interconnected by a collapsible bellows 65 preferably fabricated of metal, said bellows serving to form in conjunction with the circularly aligned interior of the housing 14, the vacuum chamber VC as a space of ring-like configuration and to additionally accommodate relative movement of said seats $BS^1$, $BS^2$ with respect to one another and to their complemental fixed seats $FS^1$, $FS^2$, said seats $BS^1$, $BS^2$ being normally engaged with their complemental fixed seats $FS^1$, $FS^2$ respectively to isolate the counterbore 40 and axial bore 51 in the members 34, 48 respectively from the said vacuum chamber VC. In this position of the bellows 65 it is in maximum distended condition. The peripheries of the discs 63, 64 are slidably contiguous with spaced portions of the interior surface on the housing 14 as shown in FIGURE 4, to coaxially stabilize the discs with respect to each other and to the valve housing. A normally preloaded spring 66 is operably disposed in said ring-like vacuum space VC in encircling relation with respect to said bellows, with opposite ends thereof reacting between the peripheral confronting marginal portions of the said discs and said floating seats into seated relation with their respective complemental fixed seats $FS^1$, $FS^2$, and each of said discs has its said peripheral marginal portion formed with a plurality of spaced cutouts 68 (see FIGURE 4) which interconnect the vacuum chamber VC with the angular faces 45, 56 terminating the inner confronting ends of said members 34, 48 respectively, whereby vacuum is at all times present at said fixed seats $FS^1$, $FS^2$ to enter the said bores 40, 51 when the bellows seats $BS^1$, $BS^2$ are selectively disengaged from their complemental fixed seats $FS^1$, $FS^2$. Accordingly, it is manifest that when the bellows seat $BS^1$ is unseated from its fixed seat $FS^1$ vacuum enters the counterbore 40, and when the bellows seat $BS^2$ is unseated from its fixed seat $FS^2$, vacuum enters the axial bore 51, it being understood that only one of said movable seats may be unseated at a time as will appear.

Slidably disposed in the counterbore 40 is an air-valve member $AV^1$, which comprises: a normal diameter portion 71 closely fitted in said counterbore, said portion having an annular external groove 72 which communicates with a blind axial bore 73 via a plurality of ports 74 through the wall of said groove (see FIGURE 3), and spaced inwardly from said groove 72 is another annular external groove 75 fitted with a ring-like packing 76, said portion 71 terminating in a reduced diameter portion 77 to form an air-vacuum chamber $AVC^1$ of ring-like configuration between the outer diameter of said reduced portion and said counterbore 40. The inner end of said reduced portion terminating in an angular circular face portion 78 which merges with a vertical circular face portion $MS^1$ normal to the axis of said valve housing to form what may be termed a "movable seat" which is normally spaced from its complemental bellows seat $BS^1$ to establish communication between said air-vacuum chamber $AVC^1$ and axial bore 73. A coaxial passageway 80 is incorporated through the bellows seat $BS^1$ and disc 63 to vent the interior of said bellows to atmosphere via the air-vacuum chamber $AVC^1$. Accordingly, in the normal disposition of said air-vacuum member portrayed in FIGURE 2, the air inlet AI would be connected to the interior of said cover 29 and opening 28, annular groove 72, ports 74, axial bore 73, air-vacuum chamber $AVC^1$, ports 39, annular passageway 38, port 25 and tube 18 to one end of a pressure differential operated motor (not shown) to inactivate the latter.

Integral with said air-valve member $AV^1$ in coaxial disposition with respect thereto is a rearwardly extending reduced diameter actuatable portion 82 which slidably projects through said central bore 37 to the exterior of said valve housing. Spaced rearwardly of said portion 35, is an external annular groove 83 on said portion 82. A flexible dust excluding boot 84 encircles the exposed portion of said portion 82 between said groove 83 and confronting end of said portion 35, said grooves being adapted to receive the circular beads 85, 86 which terminate opposite ends of said boot whereby relative sliding movement of said air-valve member $AV^1$ is accommodated with respect to said fixed member 34 to control selective operation of said control valve DV which will be fully described later.

In the preferred embodiment of my invention disclosed herein, the valve housing is rigidly connected by a support bracket "BR" bolted at 87 to the cross rod 11, the upper arcuate end of said bracket being attached at each end to the valve body by two of the cap screws 31 (see FIGURE 1). The extension 82 is connected by a double ball-joint link 88 to the upper end 89 of the ball end 90 which terminates the free end of said pitman arm 10, whereby relative movement of said pitman arm with respect to its connected cross rod 11 imparts like movements to said air-valve member $AV^1$ to dispose the latter in seated relation with its cooperating bellows seat $BS^1$ to move the latter from its cooperating fixed seat $FS^1$ thereby cutting off communication between the air-vacuum chamber $AVC^1$ and atmosphere and connecting the vacuum chamber VC to said air-vacuum chamber for power-activation of the motor (not shown) in a corresponding direction.

Slidably disposed in the bore 51 of the sleeve member 48, is a complemental air-valve member $AV^2$, which comprises: a coextensive axial bore 91, a normal diameter portion 92 closely fitted in said axial bore, said portion having an annular external groove 93 which communicates with said bore 91 via a plurality of ports 94 through the wall of said groove, and spaced inwardly from said groove is another annular external groove 95 fitted with a ring-like packing 96, said portion 92 terminating in a reduced diameter portion 97 to form another air-vacuum chamber "$AVC^2$" of ring-like configuration between the outer diameter of said reduced diameter portion and said axial bore 51. The inner end of said reduced portion terminates in an angular circular face 98 which merges with a vertical circular face portion $MS^2$ normal to the axis of said valve housing to form what may be termed another "movable seat" which is normally spaced from its complemental bellows seat $BS^2$ to establish communication between said air-vacuum chamber $AVC^2$ and axial bore 91. Accordingly, in the normal disposition of the parts best demonstrated in FIGURE 2, the air-inlet AI would be connected to the interior of said cover 29 and opening 28, annular groove 93, ports 94, axial bore 91, air-vacuum chamber $AVC^2$, ports 50, annular passageway 49, port 23 and tube 16 to the other end of the pressure differential operated motor (not shown) to inactivate the latter.

Slidable disposed in the hollow of the cover 29 which acts as a guideway is a U-shaped member "UM" comprising: an elongated segment 101 lying substantially within said hollow, the latter serving as a guide therefor, the extremities of which are formed as inturned flanges or legs 102, 103 respectively which project through the openings 27, 28 and registering openings 104, 105 respectively through the normal diameter portions of the said closure and sleeve members 34, 48 respectively, to engage the annular grooves 72, 93 carried respectively by said air-valve members $AV^1$ and $AV^2$ whereby the latter are mechanically connected for movement as a unit to selectively engage with their respective bellows seats $BS^1$ and $BS^2$ to isolate their cooperating air-vacuum chambers $AVC^1$, $AVC^2$ from the tubes 16, 18, and to connect these tubes selectively to the vacuum chamber VC in response to movement of the selected bellows seat $BS^1$ or $BS^2$ acted on by said air-valve member $AV^1$ or $AV^2$ as the case may be, to activate the said motor (not shown) in opposite directions from a central inactivated position wherein the parts of my improved control valve means DV are disposed as shown in FIGURE 2 with the vacuum chamber cut off from the air-vacuum chambers $AVC^1$ and $AVC^2$ and the latter connected to their respective tubes 16 and 18 to vent said motor to atmosphere via said air inlet AI.

The ball end 90 of the pitman arm operably projects through a suitable opening 110 in the upper side of the chambered end 111 of the cross rod 11. This ball end is disposed in a spring-loaded centralizing mechanism or device generally designated "CD" (see FIGURE 1) and comprises: a pair of longitudinally spaced star-shaped centralizing springs 112 each having a central hole 113 of such diameter as to receive only a portion of the spherical surface of the ball end 90 therebetween, the chamber in the end of the cross rod 11 being closed at its inner end by a wall 114 having a coaxial projection 115 projecting outwardly therefrom in normally spaced relation with respect to the full diameter of the ball end aforesaid, and the open end of said chamber being closed by a removable plug 116 having a coaxial projection 117 projecting inwardly therefrom in normally spaced relation with respect to the opposite side of the full diameter of said ball end, and a split retainer ring 118 engaging in internal annular groove 119 adjacent the end of the open end of said chamber prevents displacement of the plug from its normal closing position.

The aforesaid spaces normally obtaining on opposite sides of the full diameter of the ball end 90 of the pitman arm 10 with respect to the confronting ends of the projections 115, 117 define the relative operating movement of the pitman arm 10 with respect to said cross rod 11 to operate the dual valves of the said control valve means DC to their two operating "on" positions to activate the said motor (not shown), and to a common "neutral" position of control wherein said motor is inactivated.

The holes 113 in the centralizing springs 112 serve to centralize the ball end 90 on the pitman arm substantially coaxially with respect to the axis of the cross rod 11, and are preferably installed under tension to urge the ball end of the pitman arm to its normal spaced relation with respect to the projections 115, 117 wherein said control valve DC is, as best demonstrated in FIG- URE 2, venting the connected working chambers of said motor (not shown) to atmosphere via said open air-vacuum chambers AVC¹ and AVC². Each of the star-shaped springs 112 is preferably formed with a central ring-like web 120 which encircles the holes 113, and from which four equally spaced legs 121 outwardly project to produce the resilient characteristic therein.

To avoid a compressive effect in the space 122 between the air-valve member AV¹ and confronting end wall portion 123 of the closure member 34, an annular undercut 124 is formed adjacent the juncture of the portions 71, 77 which communicates via a plurality of ports 125 through the wall of said undercut with a reduced diameter bore 126 which defines the blind end of said axial bore 73. In this way, space 122 is constantly vented to atmosphere via the ports 74, groove 72, openings 27, 104 and air-inlet AI to prevent compressive effects likely attendant to reciprocal movement of said air-valve member AV¹ to open and close the air-vacuum chamber AVC¹ to the vacuum chamber VC and to the air-inlet AI respectively.

*Operation*

The manner in which my dual-valve assembly DV operates is believed manifest from the foregoing description. However, in the interest of further clarifications, a more detailed consideration will be given to its operational cycles as follows:

Assuming a condition in which the parts of the control valve means DV are in their relative positions corresponding to FIGURE 2 wherein the tubes 16, 18 are connected to atmosphere via the spaced disposition of each of the air-valve members AV¹ and AV² with respect to their cooperating bellows valve seats BS¹ and BS² respectively, and the vacuum chamber VC is closed off from said air-vacuum chambers by the seated relation of the said bellows seats BS¹ and BS² with respect to their cooperating fixed seats FS¹, FS² respectively. Thus the control valve DV may be said to be in its balanced or "neutral" condition at which the connected pressure differential motor (not shown) would be in an inactivated condition wherein its movable power member would be normally disposed in a medial position with respect to two oppositely disposed operating positions, one on each side of said power member due to the tubes 16, 18 being vented to atmosphere via said air-inlet AI and interposed chambers, ports, openings and passageways associated with each of said air-valve members AV¹ and AV² previously described in detail. Also it may be assumed that the tube 17 is connected to a source of vacuum (pressure different from atmosphere) not shown to subject the vacuum chamber VC at sub-atmospheric pressure.

To activate a double-acting motor (not shown) to either of its selective operating positions, to assist, for example, in the steering of a motor vehicle to make a right turn, the driver only has to turn the steering wheel (not shown) in a corresponding direction which moves the air-valve members AV¹ and AV² as a unit to the left as viewed in FIGURE 6 until the annular valve seat MS¹ on the member AV¹ contacts its cooperating rubber seat BS¹ of the floating bellows valve assembly BV, at which point atmospheric pressure is sealed off and cannot enter the air-vacuum chamber AVC¹. Further movement forces the rubber seat BS¹ away from the annular fixed seat FS¹ thereby opening the air-vacuum chamber AVC¹ to the vacuum chamber VC while the air-valve member AV¹ remains closed due to annular contact of this air valve on the rubber seat BS¹ of the floating valve assembly BV. Thus, as air is evacuated from the air-vacuum chamber AVC¹ by the source of vacuum connected to said vacuum chamber VC, atmospheric pressure on the opposite side of the motor power member starts moving it to assist in turning the dirigible wheels of the vehicle to negotiate a right turn. Simultaneously with the aforesaid operation, the air-valve member AV² is carried further from its cooperating rubber seat BS² to the position shown in FIGURE 6 while said seat BS² remains in contact with its cooperating fixed seat FS² under influence of the spring 66 to prevent communication of vacuum chamber VC with the air-vacuum chamber AVC². Accordingly, tube 18 which communicates with the opposite side of said motor power member (not shown) is vented to atmosphere via the open air-valve member AV² and associated air-vacuum chamber, ports, openings and passageways and air-inlet AI previously described in detail, to maintain atmospheric pressure on that side of said power member to activate the motor to assist in effecting such right turn of the vehicle until movement of the steering wheel is halted at which point, the centering spring 66 cooperates with the centralizing device CD in the cross rod 11 to restore the parts of the control valve DV to their respective balanced positions demonstrated in FIGURE 2 wherein both tubes 16, 18 are connected to atmosphere due to the spaced disposition of the air-valve members AV¹ and AV² with respect to their cooperating rubber seats BS¹ and BS² respectively, and the contact (seated) relation between said rubber seats and their respective fixed seats FS¹, FS² respectively.

When the position of the steering wheel is attained to negotiate the path of movement of the vehicle, that is, straight ahead or curving, this halting of the steering wheel results in relative adjustment of the fixed seats FS¹, FS² to again rest on their respective rubber seats BS¹ and BS², and the air-valve members AV¹ and AV² to either lightly contact (lap) their respective rubber seats or minutely spaced therefrom to de-energize the servomotor thus rendering power assistance ineffective at such halted position of the steering wheel whether driving in a straight line or on a curve. Were the servomotor continued energized after the path of the vehicle has been established by halting steering wheel movement, this would tend to "over-steer" the vehicle due to lack of coordination between steering wheel movement and servomotor actuation and thus produce a hazardous situation since the driver would be unable to set the course of the vehicle in accordance with steering wheel position. At this point, the floating bellows valve assembly BV may be considered lightly seated on each pair of seats; namely, fixed seats FS¹, FS² and movable seats MS¹, MS², and no further movement of the servomotor takes place until the steering wheel rotation is resumed in one direction or the other from its halted position, to change the direction of the vehicle. Should the servomotor tend to become energized with the control valve DV in the controlling position of FIGURE 2, then either seat MS¹ or MS² depending on the direction of servomotor energization, would separate from its cooperating rubber seat BS¹ or BS² as the case may be to vent the servomotor working chambers to atmosphere thus negating such tendency to energize which could result from road deflection of the steering linkage notwithstanding the steering wheel is held in its said halted position.

It is thus seen that the present novel control valve DV is especially adapted to efficiently control pressure differential motors of the general character disclosed in my earlier filed application, Serial No. 801,239 filed March 23, 1959, and that such control valve finds particular utility in the control of such servomotors to provide power steering assistance but not limited to such applications of use.

While I have described one operating cycle of the control valve DV when moved to the position of FIGURE 6 to control, for example, a right turn of the vehicle, a left turn may be power-assisted by moving the relatively movable parts to positions opposite to those shown in FIGURE 6 which would control energization of the servomotor in a corresponding direction of actuation.

To facilitate visualizing the positions of the parts certain of them are shown in dashed lines on FIGURE 6.

The operational behavior of the bellows spring 66 and the pair of centralizing springs 112 is unique in the present control valve. The springs 112 in the centralizing device CD constantly oppose relative movement between the valve body 14 and air-valve members $AV^1$ and $AV^2$, from their respective normal positions shown in FIGURE 2, while the spring 66 continuously biases the bellows seats $BS^1$ and $BS^2$ toward seated engagement with their respective fixed seats $FS^1$ and $FS^2$. This co-operative functioning between spring 66 and springs 112 urges the control valve assembly to its balanced "neutral" position shown in FIGURE 2, which is unlike the usual spring control of commercial hydraulic-power steering system in which a single spring is employed to bring about the "neutral" setting of such systems. Moreover, use of separate spring systems for the bellows valve assembly BV and the centralizing device CD enables relatively lighter spring action against the rubber seats $BS^1$ and $BS^2$ when the valve DV is activated to one or the other of its "on" positions, for longer service life, and, too, this lighter spring 66 plays a minor role as an assist in restoring the steering system to "neutral" driving position since the major function is carried out by the heavier springs 112 in the centralizing device CD which react between the valve body 14 and air-valve members $AV^1$ and $AV^2$ to restore them to "neutral" position shown in FIGURE 2. Thus, none of the more delicate parts, such as the bellows seats $BS^1$ and $BS^2$, is ever subjected to manual and/or spring forces imparted through the steering system proper. In this connection it should be noted that the valve body 14 is carried by the cross rod 11 and the air-valve members $AV^1$ and $AV^2$ are connected to the pitman arm 10, and the cross rod and pitman arm are interconnected for limited relative movement by the centralizing spring device CD, said relative movement defining the overall relative operating movement of the control valve DV, while the spring 66 reacts with only sufficient force as to properly seat the bellows seats $BS^1$ and $BS^2$ on their cooperating fixed seats $FS^1$ and $FS^2$, and to effect air-tight seating relation between seats $MS^1$ and $MS^2$ and said seats $FS^1$ and $FS^2$ when the control valve DV is in one of its motor activating positions shown in FIGURE 6.

*Modified mechanical connection between air-valve members*

FIGURES 7 and 8 illustrate a modified embodiment of the invention designated as a whole "$DV^a$," wherein parts analogous to those already described are designated by like characters of reference distinguished, however, by the addition of the letter "a" to each. This modification is primarily concerned with mechanical interconnecting means between the two air-valve members $AV^1$ and $AV^2$ portrayed in the embodiment first disclosed, said members in this modification being designated $AV^{1a}$ and $AV^{2a}$, and it may be assumed that otherwise the structure corresponds to and operates similarly to that of FIGURES 2 and 6 respectively.

Air-valve member $AV^{1a}$ comprises: a normal diameter portion 130 closely fitted in the counterbore 40a, a reduced diameter portion 131 projecting inwardly from said portion 130, an annular shoulder 132 defining the point of mergence between said portions, and annular external groove 133 in the portion 130 adjacent said shoulder fitted with a ring-like packing 134, a blind axial bore 135 terminating in a counterbore 136, an internal annular shoulder 137 provided at the point of mergence between bores 135, 136, and an internal annular groove 138 spaced inwardly from said shoulder 137. Air-vacuum chamber $AVC^{1a}$ defined by said counterbore 40a and reduced portion 131 is retained in this modification and functions similarly to its counterpart $AVC^{1a}$ first disclosed. It should also be observed that the valve housing 140 is modified as well as the closure member 141 to accommodate the modified air-valve member $AV^{1a}$ and its cooperating member 141.

Air-valve member $AV^{2a}$ is identical in construction to its complemental member $AV^{1a}$ with the exception that an axial bore 142 is substituted for the blind axial bore above, and which is open at the end opposite the counterbored portion.

An air inlet is shown as a passageway 143 in the closed end 144 of the valve housing, and a breather cap 145 is provided over said inlet to filter air entering said passageway via ports 146 through the wall of said inlet.

These two modified air-valve members $AV^{1a}$ and $AV^{2a}$ are mechanically interconnected for movement as a unit by linking means generally designated "L" comprising: a rod 148 freely projecting through coaxial holes 149, 150 centrally disposed in the bellows heads 63a, 64a, said holes being of larger diameter than the diameter of the rod 148 whereby air may freely transfer around said rod from one side of the bellows to the other. This rod is formed at one end with a reduced diameter terminating portion 152 defining an external annular shoulder 153 spaced from the end. A circular plate 154 is centrally bored at 155 to receive said reduced portion which is preferably riveted over to form a unitary assembly therebetween, said plate being provided with a plurality of passageways 156 radially spaced from the central hole therein, and the peripheral marginal portion 157 is confined between the shoulder 137 and a split retainer ring 158 engaging said groove 138 whereby the rod and connected plate move in unison with said air-valve member $AV^{1a}$.

The opposite terminating end of said rod is similarly formed with a reduced diameter portion 160 defining an external annular shoulder 161 spaced from said end. A similar circular plate 162 is centrally bored at 164 to receive said last mentioned reduced portion which is riveted over to form a unitary assembly therebetween. The plate 162 is also provided with a plurality of passageways 165 radially spaced from its central hole, and the peripheral marginal portion 167 thereof is confined between the shoulder 137 and another split retainer 168 engaging said groove 138.

It is, therefore, seen that the rod assembly L serves to interconnect the air-valve members $AV^{1a}$ and $AV^{2a}$ to move as a unit thus replacing the U-shaped member UM, its cover 29, openings 27, 28 and 104, 105 through the housing 14 and closure and sleeve members 34, 48 respectively as well as greatly simplifying the construction of the air-valve members $AV^1$ and $AV^2$ of the first embodiment (FIGURES 1–6).

In operation, this modified valve structure $DV^a$ is identical to that already described in connection with the first embodiment (FIGURES 1–6). As pointed out above, the primary difference between this modified structure and that of the first embodiment is the substitution of the link assembly L for the U-shaped member UM, respectively. This change contributes to a greatly simplified valve structure by producing a coaxial assembly of the housing and the internal operating parts contained therein, and as a consequence, a considerable reduction in the manufacturing steps to fabricate such parts.

In reducing the present invention to commercial practice, this modified structure would influence the design and application to the control of a double-acting servomotor, as costwise it would be much less than the construction shown in FIGURES 1–6 inclusive.

Therefore, reference may be had to the operational description of FIGURES 1–6 inclusive for a clear understanding of the operation of the present modification. To insure a clear understanding of the operation of this modified structure, it should be importantly noted that the air inlet to the air-vacuum chambers $AVC^{2a}$ and $AVC^{1a}$ is via passageway 143, bore 142, passageways 156 in the plate 154 to chamber $AVC^{2a}$, thence through the hole 150 in bellows head 64a, through the interior of said bellows 65a, hole 149 in head 63a to chamber AVC$^{1a}$. The air also flows through the passageways 156 in the plate 154 through the blind axial bore 135, ports 125a to vent space 122a to atmosphere and thereby prevent compressive effects on the air contained in said space. Thus, air is admitted to the interior of the modified valve structure DV$^a$ for selectively communicating with the air-vacuum chambers AV$^{1a}$ and AV$^{2a}$ when the one or the other of said chambers is connected to the vacuum chamber VC$^a$ to control activation of the servomotor connected to tubes 20a, 22a fully explained in detail in connection with the FIGURE 1 embodiment.

In the normal disposition of this modified valve construction, the parts assume identical positions corresponding to FIGURE 2, while one of the operated positions shown in FIGURE 8 corresponds to FIGURE 6 of the disclosure first made herein. The other operating position is considered unnecessary to show since the parts are moved to positions opposite to those shown in FIGURE 8, or in the case of the first embodiment to those shown by dashed lines in FIGURE 6.

*Modified valve structure for single-acting motor*

FIGURE 9 discloses another modification of the present invention wherein parts analogous to those already described are designated by like characters of reference distinguished, however, by the addition of the letter "b" to each.

In this modified construction, the air-valve member AV$^2$ and its cooperating parts are eliminated to produce a single-valve unit which for convenience in describing will be designated as a whole "SV" and is adapted to control a single-acting pressure differential motor (not shown) which in commercial practice is usually activated in one direction by spring means and in the opposite direction by differential pressures opposed by said spring action. Therefore, only the parts comprising the air-valve member AV$^1$ now designated AV$^{1b}$ are utilized in the present modified construction. It will be noted, however, that a disc 170 substituted for the disc 64 with or without the cut-outs 68 is retained and which is fixed to end wall 171 as by a centrally disposed rivet 172, said end wall forming one of the closed ends of a modified shortened valve housing 173 which is movable relatively to the air-valve member AV$^{1b}$ to produce the follow-up control therebetween in a manner similar to the described relative movement of housing 14. Accordingly, the bellows 65b interconnects said disc 170 and the movable disc 63b to accommodate relative movement of the latter with respect to the disc 170.

Also it will be observed on an inspection of FIGURE 9 that the U-shaped member UM has been eliminated and the hollow cover therefor now identified by the numeral 174 in lieu of numeral 29, is shortened to correspond to the shortened length of the valve housing.

In operation, this modified single-acting control valve SV, in its normal status shown in FIGURE 9, is in a motor inactivated position of control wherein one end of said motor is connected to the air-vacuum chamber AVC$^{1b}$ and the source of vacuum is connected via the tube 17b to the vacuum chamber VC$^b$. Movement of the air-vacuum member AV$^{1b}$ to the position shown in FIGURE 6 will close off the air-vacuum chamber AVC$^{1b}$ from the air inlet AI$^b$ and connect said chamber to the vacuum chamber VC$^b$ via the bellows seat BS$^{1b}$ disengaged from its cooperating seat FS$^{1b}$, to cause differential pressures to activate said motor. Thus, this modified single-acting control valve is efficiently adapted for follow-up control of a single-acting motor which utilizes pressure differential for its actuation in one direction.

It is to be understood, however, that the pitman arm 10 would be replaced by either a foot pedal or manually-operated member connected to said air-valve member AV$^{1b}$ to control this latter member since this single-acting control valve would have no utility in a motor vehicle steering system which requires the illustrated dual-valve assembly DV or DV$^a$ for assist control thereof in response to turning movements of the steering wheel. Therefore, this modified control valve is illustrated in connection with a suspended-type pedal "P" pivotally mounted on a fixed member 175 at 176, a link 177 having a ball joint connection with the air-valve member AV$^{1b}$ at 178, is pivotally connected to an intermediate point on the pedal at 179, and a return spring 180 retracts the pedal against a stop member 181 to normal position shown. Thus, depressing and releasing the pedal P reciprocates the air-valve member AV$^{1b}$ to selectively place the tube 16b in communication with vacuum and with atmosphere in the same manner as previously described in connection with the operation of the first embodiment (FIGURES 1–6).

Various arrangements of the parts of my improved control valve DV or DV$^a$ are contemplated. The bellows expanding spring 66 may be incorporated within said bellows to bias the heads 63, 64 thereof apart to seat their respective rubber seats BS$^1$ and BS$^2$ on the latter's cooperating fixed seats FS$^1$, FS$^2$ respectively, or a pair of springs may be utilized for this purpose, one on the inside and the illustrated one on the outside of said bellows, depending on the biasing force desired. The venting passageway 80 in the bellows head 63 may be incorporated in the other head or both of said heads as required to properly maintain the interior of said bellows 65 at atmospheric pressure.

Use of a metal bellows 65 is believed novel in its application in the present control valve. Aside from accommodating relative movement of the bellows heads 63, 64 with respect to one another, this collapsible structure negates any tendency of the differential pressures effective on each head to become unseated from their cooperating fixed seats FS$^1$, FS$^2$ when the vacuum chamber VC is at sub-atmospheric pressure, and the metallic characteristic is inherently more effective than a rubber-type bellows to stabilize the bellows heads 63, 64 in coaxial disposition without any tendency of the bellows to sag or become abnormally distended or disaligned to impair full seating contact of the rubber seats BS$^1$ or BS$^2$ carried by said bellows heads. Were a rubber-type bellows employed, additional parts would be required to maintain the folds thereof in aligned operating relation, and the atmospheric pressure on the inside of such would tend to bulge the bellows wall radially outwardly even though some type of metallic control member could be incorporated on the exterior thereof, which deformation would react on the seats BS$^1$ and BS$^2$ to partially or completely separate them from their cooperating seats FS$^1$, FS$^2$ respectively and at the same time affect proper seating of the air-valve members AV$^1$ and AV$^2$ against the bellows seats.

The preferred illustrative embodiment of my invention comprises two substantially identical valve units teamed together to control a double-acting pressure differential motor, either of said valve units being separately adaptable to control a single-acting motor. The invention therefore contemplates use of the two units together in the manner illustrated and described herein, or use of one of said valve units to control a single-acting motor usually actuated in one direction by spring means and in the opposite direction under influence of differential pressures as commercially practiced.

In the dual-valve asembly DV the vacuum chamber VC is disposed between the bellows heads 63, 64 while if only one of the valve units is utilized, as illustrated in FIGURE 9, the vacuum chamber would be disposed between one end of the valve body which would move with the power member of said motor (not shown) as a unit, and only one of the bellows heads, for example head 63, with the spring 66 reacting on the end of the valve body and said head 63.

The spaced relation of the valve seating arrangement when the control valve DV is in either of its operating "on" positions, one of which is demonstrated in FIGURE 6, or when in neutral "off" position demonstrated in FIGURE 2, has been purposely exaggerated to clarify interaction of the valve operating parts, but in commercial installations, the spaced relation obtaining between the bellows valve assembly BV and cooperating fixed seats and the two air-valve members, would be quite minute since the slightest separation or engagement of the seats on the complemental valves would suffice to activate or inactivate the motor controlled thereby, thus providing a very closely calibrated follow-up action in relation to steering wheel movements or equivalent member used for the same purpose.

The axial bore 51 in the sleeve member 48 may be closed at its outer end to enable this member to serve as a closure member for the opposite end of the valve housing 14 thus eliminating the end wall 15 so that the housing can be fabricated from a tubular member open at both ends to simplify and reduce cost.

Reference is now made to the terminology used in the foregoing description and in the appended claims in which the identifying expressions and/or terms employed are intended to convey meanings which include the range of reasonable equivalents in the patent sense. For example, the expressions "poppet-type valve," "dual valve," "single valve," "control valve mechanism," "control valve means" are intended to include any casing and/or chamber having either a dual-valve or a single-valve assembly therein constructed in accordance with the present invention, whether such valves respond to a steering wheel, a foot pedal or some other operator-operated member serving as the actuator for said valves. The terms "top," "bottom," "vertical," "horizontal," "left," "right," and other directional words or characters except those relating to the path of movement of an associated vehicle, are intended to have only relative connotation for convenience in describing the structure as illustrated, and are not intended to be limiting or establishing any definite position of the control valve DV or requiring any particular orientation with respect to associated structure external to the present disclosure.

The preferred embodiment and two modified forms thereof of the invention have been illustrated and described. It is to be understood, however, that the invention contemplates any and all modifications, substitutions, and/or arrangements of the cooperating element thereof that may fall within the purview of the claims hereunto appended.

Having thus described my invention, I claim:

1. A control valve adapted for vacuum-power steering use, comprising: a cylindrical housing open at one end and closed at the other; three spaced tubular connections leading from the interior of said housing to its exterior; a pair of longitudinally spaced sleeve members coaxially positioned in said housing with one of said members adjacent the closed end thereof and the other member serving to close the open end thereof; fastening means for securing said other member to said housing; a circular valve seat terminating each of the inner confronting ends of said members; a valve assembly operably disposed between said seats on said sleeve members and including a pair of spaced elements movable relatively with respect to one another and to said seats, said spaced elements being normally engaged with said seats; a ring-like vacuum chamber encircling said valve assembly and having continuous communication with one of said tubular connections; a normally preloaded spring operably disposed in said vacuum chamber to bias the pair of elements of said valve assembly into normal engagement with said seats respectively wherein said other two tubular connections are isolated from said vacuum chamber; an external annular passageway on each of said sleeve members communicating with its corresponding tubular connection of the other two connections aforesaid; a longitudinal bore through each of said sleeve members; a port through the wall of each of said sleeve members for interconnecting said longitudinal bore with said annular passageway associated with each sleeve member; an axially bored air valve member slidably disposed in each of said longitudinal bores; an inner reduced diameter portion on each of said air valve members to provide a ring-like air-vacuum chamber with respect to the sleeve member cooperating therewith, said air-vacuum chambers having continuous communication with one of said ports respectively; a circular valve seat terminating the inner confronting ends of the reduced portion of each of said air valve members and normally spaced from the said movable valve assembly when the latter is engaging both of said seats on said sleeve members; means for rigidly mounting the valve housing on a support member; means for mechanically interconnecting said air valve members to move as a unit; and manually-actuated means for actuating said air valve members to effect selective engagement thereof with said valve assembly to disengage the same from the seat on the selected air valve member without interrupting engagement of the valve assembly with the seat on the other valve member, and thereby connect the vacuum chamber to the air-vacuum chamber associated with the selected air-valve member.

2. A control valve according to claim 1 in which said valve housing comprises: a cup-shaped member; an elongated segment having three tubular extensions in which are mounted said three tubular connections, said segment having air-tight sealed engagement with the exterior cylindrical surface of said cup-shaped member; another elongated hollow segment spanning a pair of longitudinally spaced openings through the cylindrical wall of said cup-shaped member adjacent each end thereof; and an air inlet at one end of said hollow segment.

3. A control valve according to claim 1 in which said spaced members of said valve assembly are formed as circular plates coaxially disposed in longitudinally spaced relation; a collapsible assembly interconnecting said plates; a circular pliant face bonded to the exterior faces of each of said plates; a passageway through one of said plates for venting the interior of said collapsible assembly to atmosphere; and a plurality of cutouts in the peripheral marginal portion of each of said plates to provide communication between said vacuum chamber and the exterior of said valve assembly.

4. A control valve according to claim 2 in which each of said sleeve members has an external annular groove on each side of said annular passageway for receiving a pliant packing to effect an air-tight seal between said sleeve members and housing.

5. A control valve according to claim 4 in which said air valve members each comprises: an annular external groove in the normal diameter thereof to receive a pliant packing to effect an air-tight seal with the bore in the cooperating sleeve member; and an annular external groove spaced from said first-mentioned groove adjacent the outer end thereof.

6. A control valve according to claim 5 in which said means for mechanically interconnecting said air valve members comprise: a U-shaped member having a longitudinal segment terminating at each end with a leg normal to said segment, said U-shaped member being slidably disposed in said hollow housing segment with each of said legs projecting through the openings respectively in said housing and engaging the grooves adjacent the outer ends of said air valve members whereby movement of one of said air valve members imparts a like movement to the other air valve member.

7. A control valve adapted for vacuum-power steering use, comprising: a housing, a pair of tubular members movable with said housing as a unit, and longitudinally spaced in coaxial disposition to provide a vacuum chamber therebetween, a valve assembly including a pair of elements in spaced relation operatively disposed in said vacuum chamber and movable relatively with respect to one another and to said tubular members; a valve seat terminating each of the inner confronting ends of said tubular members and normally engaging a face portion on each of said pair of elements respectively; a complementary air valve member movably disposed in each of said tubular members in air-tight sealed relation therewith on opposite sides of said pair of elements normally in spaced relation with respect thereto; an actuating element for moving said air valve members simultaneously; a valve seat terminating each of the inner confronting ends of said air valve members; a ring-like air-vacuum chamber disposed between each of said air valve members and their complementary tubular members respectively; a conduit leading through said housing from said vacuum chamber to the exterior thereof; a conduit leading through said housing from each of said air-vacuum chambers to the exterior thereof; an air inlet common to both of said air-vacuum chambers; passageway means interconnecting said last-named conduits to said air-vacuum chambers; a normally preloaded spring operably disposed in said vacuum chamber to bias said pair of elements apart into engagement with their respective cooperating valve seats on said tubular members to isolate said vacuum chamber from the pair of air-vacuum chambers aforesaid; and mechanical means for interconnecting said air valve members to move as a unit in response to actuation of said actuating element.

8. A control valve according to claim 1 in which said pair of spaced elements in the said valve assembly are interconnected by a collapsible assembly, and a centrally disposed aperture is provided through each of said elements to vent the interior of said collapsible assembly to atmosphere via the axial bore in one of said air-valve members and said air inlet.

9. A control valve according to claim 8 including mechanical connecting means comprising: a link projecting through a hollow co-extensive with said collapsible assembly and the apertures in said pair of elements, with the terminating ends of said link provided with a mechanical connection with each of said air-valve members, said mechanical connection including cooperating means on each end of said link and the connected air-valve member for interconnecting them to move in unison relatively to said valve assembly.

10. A control valve according to claim 9 in which said cooperating means comprise: an internal annular shoulder in each of said axial bores, an annular internal groove spaced from each of said shoulders, a circular plate axially fixed on each end of said link, a plurality of radially disposed passageways through each of said plates to accommodate free flow of air around said link to opposite sides of said valve assembly, and a peripheral marginal portion on each of said plates confined in the space between said shoulder and spaced groove by a split retaining ring engaging each of said grooves whereby the link and air-valve members are mechanically joined to form an axially movable unitary assembly.

11. A control valve adapted for pressure differential motor use, comprising: a movable casing wall open at one end and closed at the other; an axial bore defining the open end of said casing; a counterbore merging with the inner end of said axial bore; another counterbore between the closed end of said casing and said first-named counterbore; an internal annular shoulder defined by the juncture between said two counterbores, to provide a valve seat; a movable element normally engaging said valve seat; a ring-like vacuum chamber in the other counterbore and coextensive therewith, said chamber being adapted to encircle said movable element in part; a collapsible member interconnecting said movable element with the closed end of said casing to define the inner side of said vacuum chamber; a complementary air-valve member movably disposed in said axial bore and first-named counterbore in air-tight sealed relation therewith; a second valve seat terminating the inner end of said air-valve member, and normally spaced from said movable element; a ring-like air-vacuum chamber provided between the forward end portion of the air-valve member and said first-named counterbore; a conduit leading through said casing wall from said vacuum chamber to the exterior thereof; another conduit leading through said casing wall from said air-vacuum chamber to the exterior thereof; an air inlet through the casing wall in continuous communication with the first-named counterbore; passageway means incorporated in said air-valve member to interconnect said air inlet with said air-vacuum chamber when the valve seat on the latter is normally spaced from said movable element; a normally preloaded spring operably disposed in said vacuum chamber, and adapted to react between the closed end of said casing and said movable element to bias the latter into seated engagement with the valve seat in said casing whereby communication between the vacuum chamber and said air-vacuum chamber is interrupted; actuatable means having a normal position for moving said air-valve member relatively to said casing into engagement with said movable element to move the latter from said valve seat in said casing in opposition to reaction from said first-named spring and thereby interrupt communication between said air inlet and air-vacuum chamber and establish communication between the latter chamber and said vacuum chamber; another normally preloaded spring adapted to retract the air-valve member and actuatable means to their respective normal positions; and a pair of abutment-engaging elements for defining the normal positions of said air-valve member and actuatable means.

12. A control valve constructed in accordance with claim 11 plus a removable tubular member telescopically-engaging the interior of said casing, said last-named member incorporating said axial bore and first-named counterbore to provide said valve seat at the juncture of said two counterbores; and fastening means for stabilizing said last-named member in said casing to move as a unit therewith.

References Cited in the file of this patent
UNITED STATES PATENTS

| | | |
|---|---|---|
| 1,875,226 | Dewandre | Aug. 30, 1932 |
| 2,432,721 | Brown | Dec. 16, 1947 |
| 2,503,827 | Langmore et al. | Apr. 11, 1950 |
| 2,702,529 | Doerfner | Feb. 22, 1955 |
| 2,702,685 | Copsek | Feb. 22, 1955 |
| 2,719,511 | Presnell | Oct. 4, 1955 |
| 2,729,242 | Olson | Jan. 3, 1956 |
| 2,788,770 | Folkerts | Apr. 16, 1957 |
| 2,798,461 | Gold et al. | July 9, 1957 |

FOREIGN PATENTS

| | | |
|---|---|---|
| 955,910 | France | Jan. 20, 1950 |